(12) United States Patent
Tanaka

(10) Patent No.: US 11,941,671 B2
(45) Date of Patent: Mar. 26, 2024

(54) CUSTOMER ANALYSIS DEVICE

(71) Applicant: Nomura Research Institute, Ltd., Tokyo (JP)

(72) Inventor: Tatsuo Tanaka, Tokyo (JP)

(73) Assignee: Nomura Research Institute, Ltd., Tokyo (JP)

( * ) Notice: Subject to any disclaimer, the term of this patent is extended or adjusted under 35 U.S.C. 154(b) by 142 days.

(21) Appl. No.: 17/679,522

(22) Filed: Feb. 24, 2022

(65) Prior Publication Data
US 2022/0277322 A1    Sep. 1, 2022

(30) Foreign Application Priority Data

Feb. 26, 2021 (JP) ................................ 2021-029715

(51) Int. Cl.
*G06Q 30/02* (2023.01)
*G06Q 30/0201* (2023.01)
(Continued)

(52) U.S. Cl.
CPC ..... *G06Q 30/0282* (2013.01); *G06Q 30/0201* (2013.01); *G06Q 30/0203* (2013.01); *G06Q 40/02* (2013.01)

(58) Field of Classification Search
CPC .................................................... G06Q 30/02
See application file for complete search history.

(56) References Cited

U.S. PATENT DOCUMENTS

| 2006/0235861 A1 | 10/2006 | Yamashita et al. |
| 2016/0034930 A1 | 2/2016 | Verschoor et al. |

(Continued)

FOREIGN PATENT DOCUMENTS

| JP | 2006-268405 A | 10/2006 | |
| JP | 2021-140778 A | 9/2021 | |
| WO | WO-2014145149 A1 * | 9/2014 | ............. G06Q 30/01 |

OTHER PUBLICATIONS

Amy K. Smith, Ruth N. Bolton, The Effect of Customers' Emotional Responses to Service Failures on Their Recovery Effort Evaluations and Satisfaction Judgments, Journal of the Academy of Marketing Science, vol. 30, No. 1, pp. 5-23, 2002. (Year: 2002).*

(Continued)

*Primary Examiner* — Kurtis Gills
(74) *Attorney, Agent, or Firm* — RANKIN, HILL & CLARK LLP

(57) ABSTRACT

A customer analysis device acquires replies from a user who receives a financial service to one or more first type questions defined for surveying an action desire for the financial service and calculates an action indicator based on the one or more replies. Subsequently, the customer analysis device acquires replies from the user who receives the financial service to a plurality of second type questions defined for surveying a customer emotion for the financial service and calculates a plurality of types of emotion indicators based on the plurality of replies. The customer analysis device calculates correlation coefficients between the action indicator and each of the plurality of types of emotion indicators, and graphically displays an influence of each of the plurality of emotion indicators on the action indicator based on the calculated correlation coefficients.

5 Claims, 16 Drawing Sheets

(51) Int. Cl.
*G06Q 30/0203* (2023.01)
*G06Q 30/0282* (2023.01)
*G06Q 40/02* (2023.01)

(56) References Cited

U.S. PATENT DOCUMENTS

| | | | |
|---|---|---|---|
| 2016/0352900 A1* | 12/2016 | Bell | H04M 3/5175 |
| 2018/0158090 A1 | 6/2018 | Glynn et al. | |
| 2019/0110728 A1* | 4/2019 | Sbodio | G09B 7/00 |
| 2020/0272961 A1 | 8/2020 | Ozasa et al. | |
| 2021/0272167 A1 | 9/2021 | Tanaka | |

OTHER PUBLICATIONS

Tatsuo Tanaka, "CX Strategy Realizing "Customer First" Business Operation", Regional Banking, Aug. 2019 issue, pp. 12 to 18, General incorporated association of The Second Association of Regional Banks.

Newsrelease, Nomura Research Institute, Ltd., Sep. 3, 2019, from the Internet: <https://www.nri.com/jp/news/newsrelease/lst/2019/cc/0903_1>.

Tatsuo Tanaka, "Customer Loyalty Measurement Indicator Solving Problems Unique to Japanese Financial Institutions", Financial Information Technology Focus, Oct. 2019 edition, pp. 12 to 13, Nomura Research Institute, Ltd., from the Internet: <https://www.nri.com/jp/knowledge/publication/fis/kinyu_itf/lst/2019/10/06>.

Tatsuo Tanaka, "CX Strategy Realizing "Customer-First Business Operation" in Financial Institutions", Knowledge Creation and Integration, Nov. 2019 edition, pp. 62 to 73, Nomura Research Institute, Ltd.

Japan Financial News Co., Ltd., "New Indicator of "Customer First" Policy", Nikkin (The Japan Financial News), No. 4923, Nov. 8, 2019, p. 13.

Tatsuo Tanaka, "Realize "Customer-First Business Operation" by Introduction of CX Strategy", The Weekly Financial Affairs Magazine, Nov. 25, 2019 edition, pp. 38 to 42, General Incorporated Association Kinzai Institute for Financial Affairs, Inc.

Tatsuo Tanaka, "CX Indicator and CX Management Methodology for Assisting Promotion and Rooting of "Customer-First Business Operation" in Japanese Financial Institutions," NRI Journal, Nomura Research Institute, Ltd., Dec. 17, 2019, Retrieved from the Internet: <https://www.nri.com/jp/journal/2019/1217>.

Tatsuo Tanaka, "Analysis Based on Two Indicators: "Emotion" and "Behavior" for Financial Institutions Offering Risk Products", Fund Marketing, vol. 54, Jan. 2020 edition, pp. 16 to 17, Edit Inc.

\* cited by examiner

ACTION INDICATOR

FIG. 3

| BUSINESS INDICATOR \ ACTION INDICATOR | (A) BANK | | (B) SECURITIES COMPANY | |
|---|---|---|---|---|
| | NPS N=862 | CX N=2,980 | NPS N=1,758 | CX N=6,150 |
| (R1) DEPOSIT AMOUNT | 0.72 | 0.68 | 0.46 | 0.74 |
| (R2) INVESTMENT AMOUNT IN RISK PRODUCT | 0.75 | 0.72 | 0.38 | 0.85 |
| (R3) WALLET SHARE | 0.64 | 0.82 | 0.46 | 0.67 |
| (R4) RATE OF CHANGE IN DEPOSIT AMOUNT | 0.54 | 0.71 | 0.48 | 0.73 |
| (R5) RATE OF CHANGE IN INVESTMENT AMOUNT IN RISK PRODUCT | 0.54 | 0.71 | 0.48 | 0.79 |

FIG. 4

| EMOTION INDICATOR | | EXPECTATION | EVALUATION |
|---|---|---|---|
| RELIABILITY | SYMPATHY | | |
| | ABILITY | | |
| | PERSONALITY | | |
| | EFFECTIVENESS OF RISK MANAGEMENT | | |
| | TRANSPARENCY | | |
| CONVENIENCE | ANY TIME | | |
| | SIMPLE | | |
| | SPEEDY | | |
| | EASY TO UNDERSTAND | | |
| | USEFUL | | |
| ECONOMIC RATIONALITY | COST | | |
| | PROFIT | | |
| | ADDED VALUE | | |

FIG. 14

[RECOMMENDATION INTENTION] Q. HOW LIKELY ARE YOU TO RECOMMEND THE CURRENT PERSON IN CHARGE TO A CLOSE FRIEND OR RELATIVE?

HIGHLY UNLIKELY TO RECOMMEND     HIGHLY LIKELY TO RECOMMEND

| 0 | 1 | 2 | 3 | 4 | 5 | 6 | 7 | 8 | 9 | 10 |
|---|---|---|---|---|---|---|---|---|---|----|

PLEASE TELL US A REASON WHY YOU SELECT THE ABOVE NUMBER

IF YOU SELECT THE ABOVE NUMBER BECAUSE YOU DO NOT INTEND TO RECOMMEND ANY PERSON IN CHARGE AT A BANK OR A SECURITIES COMPANY OTHER THAN THE CURRENT PERSON IN CHARGE TO OTHERS, PLEASE WRITE A CHECK MARK HERE ☐

FIG. 15

[CONTINUATION INTENTION] Q. HOW LIKELY ARE YOU TO CONTINUE TO USE ○○○○ THROUGH THE CURRENT PERSON IN CHARGE IN THE FUTURE?

| HIGHLY UNLIKELY TO CONTINUE | | | | | | | | | | HIGHLY LIKELY TO CONTINUE |
|---|---|---|---|---|---|---|---|---|---|---|
| 0 | 1 | 2 | 3 | 4 | 5 | 6 | 7 | 8 | 9 | 10 |

PLEASE TELL US A REASON WHY YOU SELECT THE ABOVE NUMBER

IF YOU SELECT THE ABOVE NUMBER BECAUSE
YOU DO NOT INTEND TO USE ANY PERSON IN CHARGE AT A BANK
OR A SECURITIES COMPANY OTHER THAN THE CURRENT PERSON IN CHARGE,
PLEASE WRITE A CHECK MARK HERE ☐

FIG. 16

[PURCHASE INTENTION] Q. HOW LIKELY ARE YOU TO PURCHASE A FINANCIAL PRODUCT AT ○○○○ THROUGH THE CURRENT PERSON IN CHARGE IN THE FUTURE?

HIGHLY UNLIKELY TO PURCHASE        HIGHLY LIKELY TO PURCHASE

| 0 | 1 | 2 | 3 | 4 | 5 | 6 | 7 | 8 | 9 | 10 |
|---|---|---|---|---|---|---|---|---|---|----|

PLEASE TELL US A REASON WHY YOU SELECT THE ABOVE NUMBER

IF YOU SELECT THE ABOVE NUMBER BECAUSE YOU DO NOT INTEND TO PURCHASE A FINANCIAL PRODUCT AT A BANK OR A SECURITIES COMPANY THROUGH ANY PERSON IN CHARGE OTHER THAN THE CURRENT PERSON IN CHARGE, PLEASE WRITE A CHECK MARK HERE ☐

CUSTOMER ANALYSIS DEVICE

BACKGROUND

1. Technical Field

The present invention relates to customer analysis, particularly to a customer analysis technique for implementing customer-oriented business operation.

2. Description of the Related Art

In recent years, importance of customer experience has increased. The customer experience is not only a material, financial, objective, and rational value of goods and services, but also a subjective and emotional value that appeals to customer emotion for all customer experiences including promotion before purchase of goods or services and support after purchase of the goods or services.

Bernd H. Schmitt, a professor at Columbia University classifies emotional values into five types: sense (sensual), feel (emotional), think (intellectual), act (action), and relate (lifestyle). When the five senses of a customer are stimulated by deliciousness, good touch, and the like (sense), an internal feeling of the customer is stimulated by coolness, cuteness, and the like (feel), the customer desires knowledge or performs self-development (think), the customer experiences a different life from before (act), or the customer has a sense of belonging or sharing such as participating in activity (relate), the customer recognizes his/her emotional value, that is, the customer experience.

It is said that the customer experience has a strong correlation with profitability of a company, and it is said that advanced companies are focusing on enhancing the customer experience (see JP 2006-268405 A).

SUMMARY

However, there is no established method for measuring the customer experience. For example, there has been proposed a method for asking a customer "Are you satisfied with services of our company?" and getting the customer to perform a five-step evaluation. However, companies that have been highly evaluated by such a method do not necessarily gain high profitability. A more rational method for measuring the customer experience is required.

The present invention has been completed based on the above problem recognition, and a main object of the present invention is to provide a technique for proposing a method for setting an action indicator highly correlated with profitability and improving the action indicator.

A customer analysis device in an aspect of the present invention includes: an action indicator calculation unit that acquires replies from a user who receives a predetermined service to one or more first type questions defined for surveying an action desire for the service and calculates an action indicator based on the one or more replies; an emotion indicator calculation unit that acquires replies from the user who receives the service to a plurality of second type questions defined for surveying a customer emotion for the service and calculates a plurality of types of emotion indicators based on the plurality of replies; a correlation calculation unit that calculates a correlation coefficient between the action indicator and each of the plurality of types of emotion indicators; and an influence display unit that graphically displays an influence of each of the plurality of emotion indicators on the action indicator based on the calculated correlation coefficient.

A customer analysis device in another aspect of the present invention includes: a reply acquisition unit that acquires main replies from a user to a question for surveying a desire to purchase a new service from a current person in charge who provides or intermediates a predetermined service, a question for surveying a desire to continue to use the service by the person in charge, and a question for surveying a desire to recommend the person in charge to another user, and also acquires sub-replies regarding preconditions for the main replies; and an achievement calculation unit that calculates an achievement value of the person in charge based on the plurality of main replies regarding the person in charge.

The achievement calculation unit selects a main reply to be used for calculation of an achievement value based on the sub-replies.

The present invention easily improves the customer experience.

BRIEF DESCRIPTION OF THE DRAWINGS

FIG. 3 is a diagram illustrating a survey result for a strength of correlation between a business indicator and each of a recommendation intention and CX;

FIG. 4 is a data structure diagram of the emotion indicator;

FIG. 14 illustrates an excerpt of a questionnaire regarding a recommendation intention;

FIG. 15 illustrates an excerpt of a questionnaire regarding a continuation intention;

FIG. 16 illustrates an excerpt of a questionnaire regarding a purchase intention.

DETAILED DESCRIPTION

Figure 1:
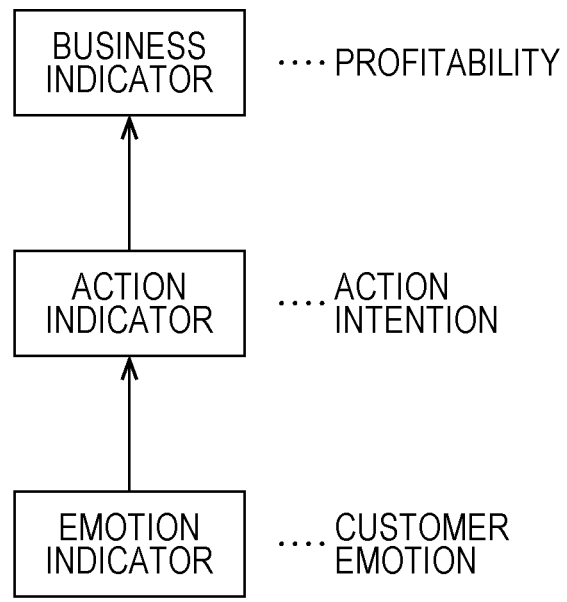
FIG. 1 is a schematic diagram for describing a relationship among a business indicator, an action indicator, and an emotion indicator.

FIG. 1 is a schematic diagram for describing a relationship among a business indicator, an action indicator, and an emotion indicator.

The business indicator is an indicator indicating profitability of a service provided by a company. As the business indicator, for example, sales, an operating profit ratio, and a repeat rate are considered. In the present embodiment, customer experience is represented by two types of indicators, "action indicator" and "emotion indicator". Note that in the present embodiment, "service" is not limited to intangible services such as meals and lodging, but also includes a purchase of tangible items such as products.

The action indicator indicates strength of an action intention (for example, purchase desire) for a service. The emotion indicator indicates what emotion a user who actually receives a service feels and how much the user feels the emotion. When a user positively strengthens the action intention for a service, in other words, when the action indicator is large, it is considered that the business indicator indicating profitability is also improved. In addition, when a user has a positive emotion for a service, in other words, when the emotion indicator is large, it is considered that the action indicator is high. It is considered that the emotion indicator of a user who feels customer experience is increased. A psychological model illustrated in FIG. 1 is a model obtained by modeling a correlation among three factors of emotion, action, and profit in which the emotion urges the action and the action leads to the profit.

A customer analysis device in the present embodiment analyzes a customer emotion and proposes what service is to be improved based on the analysis result in order to improve profitability (business indicator).

In the following, a financial service provided by a financial institution such as a bank or a securities company will be described as a target.

By the way, there is a net promoter score (NPS) as an indicator for searching for customer experience. The NPS was proposed in 2003 by Frederick F. Reichheld of an American consulting firm, Bain & Company. First, the NPS asks a user to reply to a question such as "How likely are you to recommend this company (product, service, and brand) to a close friend or colleague?" within a range of 0 to 10 points. The NPS regards 9 points or more as "promoters", 8 or 7 points as "passives", and 6 points or less as "detractors", and uses a value obtained by subtracting a ratio of detractors from a ratio of promoters in a user group to be surveyed as an indicator value. The NPS is recognized to have certain effectiveness, which is currently a de facto standard.

However, the NPS also has its weaknesses. In particular, the NPS considers a financial service as a nuisance. It has been found that the NPS tends to be very low when the NPS is used in order to search for customer experience in the financial service. According to a survey conducted by the present applicant, about 80% of respondents replied "I think so" or "if anything, I think so" to a question "Do you think that a financial institution should not be recommended to people?" (the number of samples: 12,612).

When we asked a reason for this to users who had thought (hereinafter, referred to as "noise thought") that interferes with analyzing of customer psychology as described above, most of the users replied "(choice of financial institution) is our own responsibility, "I am not responsible when something happens", "people have different expectations and values", "I do not want to talk about money with others", and the like.

The NPS does not work well for a service that is prone to noise thought that "the service should not be recommended to people" such as the financial service. Therefore, in the present embodiment, the following action indicator is proposed in order to compensate for the drawbacks of the NPS.

Figure 2:
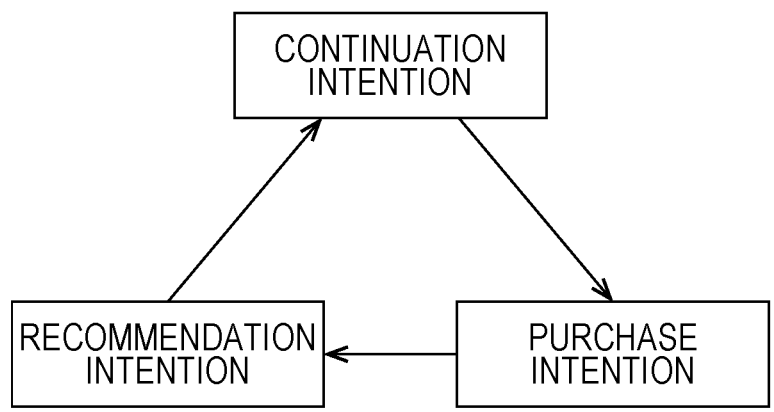
FIG. 2 is a schematic diagram for describing the action indicator.

FIG. 2 is a schematic diagram for describing the action indicator.

In the present embodiment, the action indicator is decomposed into three elements of "recommendation intention", "continuation intention", and "purchase intention".

As in the NPS, for the recommendation intention, we ask a user to evaluate a service on a scale of 10 points for the question "Are you likely to recommend a service to a close friend or colleague?" Hereinafter, an evaluation value of the recommendation intention is referred to as "recommendation value". The recommendation value is acquired for each user.

Noise thought in the recommendation intention is that "(this service) should not be recommended to others". Since the recommendation intention includes such noise thought, the recommendation value tends to be low (decreasing bias) as described above.

The continuation intention indicates a user's desire to continue a service. For the continuation intention, we ask a user to evaluate our service on a scale of 10 points for a question "How likely are you to continue to use our service in the future?". For example, 10 points may be set for 100%, 9 points may be set for 90% or more and less than 100%, and 0 points may be set for less than 10%. Hereinafter, the evaluation value of the continuation intention is referred to as "continuation value". The continuation value is acquired for each user.

Even when a user has noise thought about the recommendation intention, if the user is satisfied with a service, it is considered that the user continues the service. Therefore, the continuation value complementarily functions for the decreasing bias of the recommendation value.

On the other hand, the noise thought in the continuation intention is "I do not like a service but it is troublesome to change the service". The continuation intention includes such noise thought (inertial continuation), and therefore the continuation value tends to be high (increasing bias).

The purchase intention indicates a new use desire for a service by a user. For the purchase intention, we ask a user to evaluate a service on a scale of 10 points for a question "How likely are you to trade, transact, and manage a risk product in our company in the future?" For example, 10 points may be set for 100%, 9 points may be set for 90% or more and less than 100%, and 0 points may be set for less than 10%. Hereinafter, an evaluation value of the purchase intention is referred to as "purchase value". The purchase value is acquired for each user.

Even when a user has noise thought about the continuation intention, if the user does not like a service, it is considered that the user is less likely to buy a new financial product. For this reason, the purchase value complementarily functions for the increasing bias of the continuation value.

Noise thought in the purchase intention is "I no longer want to buy anything". Due to this noise thought, the purchase value tends to be low (decreasing bias).

Even when a user has noise thought about the purchase intention, if the user likes a service, it is considered that the used is more likely to recommend the service to others. Therefore, the recommendation value complementarily functions for the decreasing bias of the purchase value.

In the present embodiment, the recommendation value, the continuation value, and the purchase value are acquired based on the above-described three questions (hereinafter, referred to as "first type question") regarding the recommendation intention, the continuation intention, and the purchase intention, and an average value of the recommendation value, the continuation value, and the purchase value is calculated as an action indicator. The action indicator is calculated for each user. Hereinafter, the action indicator thus calculated is referred to as "CX indicator" or simply "CX". The present inventor hypothesized that in the CX indicator, by canceling out noise thoughts included in the recommendation intention, the continuation intention, and the purchase intention, it would be possible to index customer psychology more appropriately.

FIG. 3 illustrates a survey result for the strength of correlation between the business indicator and each of the recommendation intention and the CX.

The present inventor separately surveyed a person who deposits the most financial assets in a bank as a depository of financial assets (A: person who prefers a bank) and a person who deposits the most financial assets in a securities company as a depository of financial assets (B: person who prefers securities). Note that those who have noise thought regarding the recommendation intention are excluded from the survey target.

First, as the business indicator, five types of "(R1) deposit amount in a target financial institution", "(R2) investment amount in risk product at a target financial institution", "(R3) wallet share (a ratio of a deposit amount in a target financial institution to a total financial asset of a customer), "(R4) rate of change in a deposit amount in a target financial institution compared to that five years ago", and "(R5) rate of change in an investment amount in risk product at a target financial institution compared to that five years ago" were defined.

Using 862 persons who prefer a bank as a target, a correlation coefficient between only the recommendation value (recommendation intention (NPS)) and each of the business indicators was obtained, and correlation coefficients of the NPS with respect to "(R1) deposit amount" and "(R2) investment amount in risk product" were 0.7 or more, which indicates a relatively strong correlation. On the other hand, correlation coefficients of the recommendation value with respect to "(R3) wallet share", "(R4) rate of change in a deposit amount", and "(R5) rate of change in an investment amount in risk product" were less than 0.7, which does not indicate a very strong correlation.

On the other hand, using 2980 persons who prefer a bank as a target, a correlation coefficient between the CX (average value of the recommendation value, the purchase value, and the continuation value) and each of the business indicators was obtained, and correlation coefficients with respect to all four business indicators other than "(R1) deposit amount" were 0.7 or more. In addition, the correlation coefficient for "(R1) deposit amount" was 0.68, which is slightly less than the recommendation value. As long as we have surveyed persons who prefer a bank as a target, it has been confirmed that CX (three-valued average) has a stronger positive correlation with the various business indicators than only the recommendation value.

Using 1758 persons who prefer securities as a target, a correlation coefficient between the recommendation value and each of the business indicators was obtained, and the correlation coefficients of the NPS with respect to all the five types of business indicators were less than 0.5. For this reason, the NPS with only the recommendation value is not an appropriate indicator for searching for customer experience of a person who prefers securities.

On the other hand, using 6150 persons who prefer securities as a target, a correlation coefficient between the CX (three-valued average) and each of the business indicators was obtained, and the correlation coefficients with respect to all four business indicators other than "(R3) wallet share" were 0.7 or more. In addition, the correlation coefficient of "(R4) wallet share" was 0.67, which is a better result at least than only the recommendation value (NPS). For a person who prefers securities, it has been confirmed that the CX has a clear advantage over the NPS.

As described above, despite analyzing a person who does not have noise thought as the survey target, the CX as a whole has a stronger positive correlation with the business indicators than the NPS. In particular, it has been confirmed that the CX is effective for a person who prefers securities. The hypothesis that profitability can be improved by improving the CX as the action indicator has been confirmed, and therefore it is necessary to examine what measures should be taken to improve the CX as a next stage. In the present embodiment, as described with reference to FIG. 1, a measure for improving the action indicator is examined by defining the emotion indicator that drives the action indicator (CX) and analyzing the emotion indicator.

FIG. 4 is a data structure diagram of the emotion indicator.

The present applicant has collected and accumulated tens of thousands of questionnaires from customers who receive a financial service. These questionnaires include free comments. The present inventor has analyzed a large number of free comments, and has concentrated various evaluations and requests regarding a financial service on three axes of "reliability", "convenience", and "economic rationality".

The reliability includes the following five types of evaluation points (hereinafter, referred to as "emotion points").

(P1) Sympathy (Can servicer show sympathy for customer problem?)

(P2) Ability (Does servicer have expertise to respond to customer request?)

(P3) Personality (Do you think that servicer is kind and works enthusiastically?)

(P4) Effectiveness of risk management (Is risk of financial service appropriately managed?)

(P5) Transparency (Is sincere response performed without lie or concealment?)

The convenience includes the following five types of emotion points.

(P6) Any time (Is it possible to receive service at any time?)

(P7) Simple (Is it possible to receive desired service simply?)

(P8) Speedy (Is service executed quickly?)

(P9) Easy to understand (Is proceeding and procedure for receiving service easy to understand?)

(P10) Useful (Is service useful?)

The economic rationality includes the following three types of emotion points.

(P11) Cost (Are costs such as fees appropriate?)

(P12) Profit (Is it possible to obtain profit through service)

(P13) Added value (Is it possible to feel added value?)

For each of the above 13 types of emotion points, a user inputs a magnitude of expectation before receiving a service (hereinafter, referred to as "expectation value") and a degree of satisfaction after actually receiving the service (hereinafter, referred to as "evaluation value") on a scale of 10 points.

In the present embodiment, a value obtained by subtracting the expectation value from the evaluation value is calculated as the emotion indicator. For each user, 13 types of emotion indicators are calculated, corresponding to the 13 types of emotion points. Next, a correlation coefficient of each of the 13 types of emotion indicators for the action indicators (CX) is obtained (which will be described in detail below).

In order to analyze the emotion indicator, various questions (hereinafter, referred to as "second type question") are prepared in advance for a user. For example, for "(P1)

sympathy", a question "Do you think that servicer is making an effort to understand your request?" is prepared. The emotion indicator for "(P1) sympathy" is calculated based on the user's reply (expectation value and evaluation value) to the question.

As other examples, for "(P8) speedy", a question such as "Is it possible to make a transaction without missing timing of instantaneous trading?" is prepared, and for "(P11) cost", a question such as "Do you think that fees are cheap?" is prepared. One second type question may be associated with one emotion point, or a plurality of second type questions may be associated with one emotion point. For example, for a certain emotion point PX, a weighted average expectation value and a weighted average evaluation value are calculated by weight-averaging reply values (expectation value and evaluation value) to each of the plurality of second type questions, and the weighted average evaluation value–the weighted average expectation value may be calculated as the emotion indicator of the emotion point PX.

By calculating a difference value between the evaluation value and the expectation value as the emotion indicator, the emotion indicator indicates the magnitude of a gap between expectation and reality. If reality is higher than expectation, the emotion indicator is a positive value. On the other hand, when reality is lower than expectation, the emotion indicator is a negative value. As a human psychological tendency, when there is a large gap between expectation and reality, a person is moved or dissatisfied. The emotion indicator in the present embodiment numerically indicates how much a customer's emotion is shaken for the plurality of emotion points.

Figure 5:
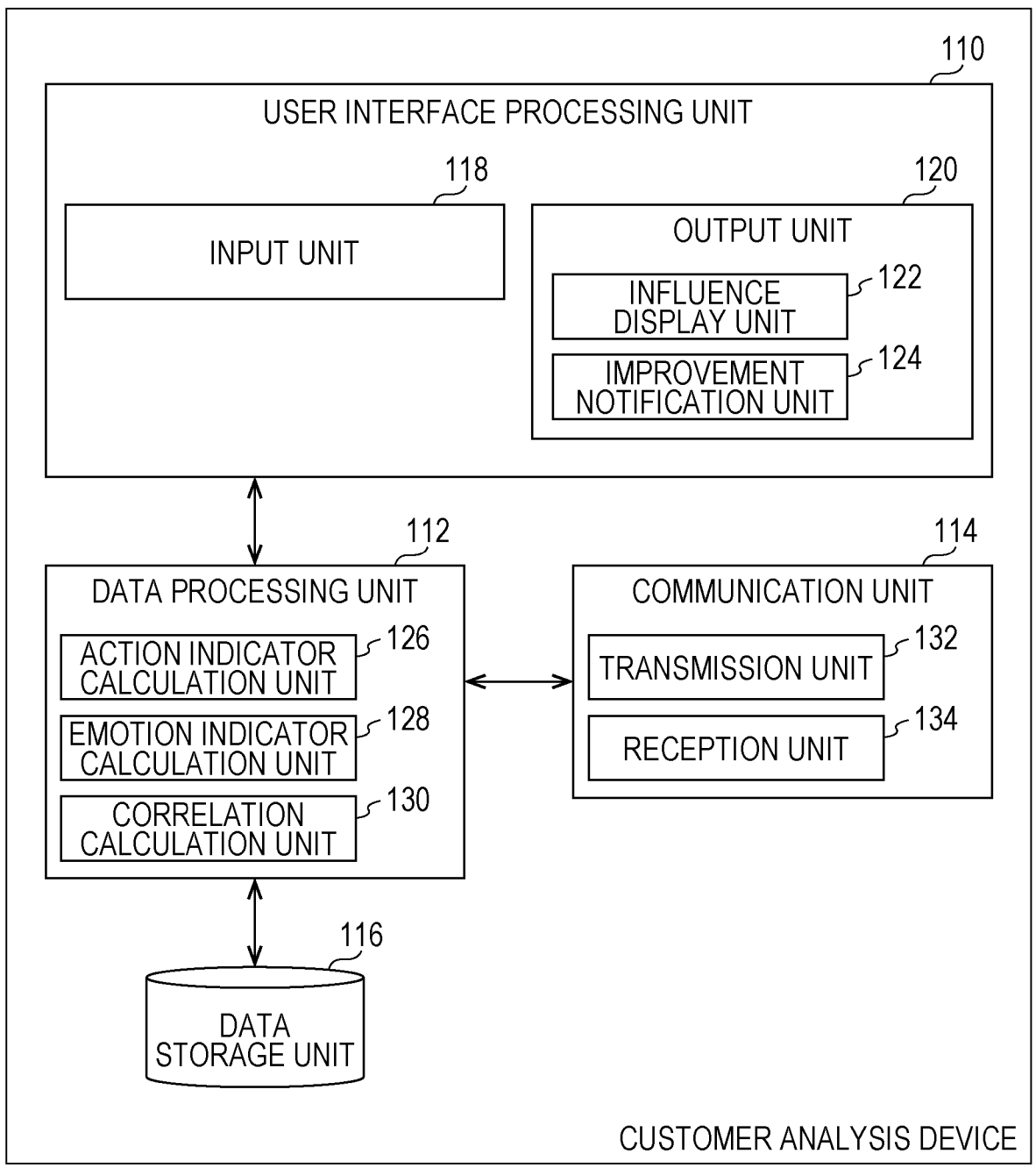
FIG. 5 is a functional block diagram of a customer analysis device.

FIG. 5 is a functional block diagram of a customer analysis device 100.

The customer analysis device 100 includes, as components, an arithmetic unit such as a central processing unit (CPU) or various coprocessors, a storage device such as a memory or a storage, hardware including a wired or wireless communication line connecting the arithmetic unit and the storage device to each other, and software that is stored in the storage device and supplies a processing instruction to the arithmetic unit. A computer program may be configured by a device driver, an operating system, various application programs located in an upper layer thereof, and a library that provides a common function to these programs. Each block described below indicates not a configuration in a hardware unit but a block in a functional unit.

The customer analysis device 100 includes a user interface processing unit 110, a communication unit 114, a data processing unit 112, and a data storage unit 116.

The user interface processing unit 110 receives an operation from a user, and is in charge of processing related to a user interface such as image display or voice output. The communication unit 114 is in charge of communication processing with an external device via the Internet. The data storage unit 116 stores various types of data. The data processing unit 112 executes various types of processing based on data acquired by the user interface processing unit 110 and the communication unit 114 and data stored in the data storage unit 116. The data processing unit 112 also functions as an interface of the user interface processing unit 110, the communication unit 114, and the data storage unit 116.

The user interface processing unit 110 includes an input unit 118 that receives an input from a user, and an output unit 120 that outputs various type of information such as image and voice to the user.

The output unit 120 includes an influence display unit 122 and an improvement notification unit 124. The influence display unit 122 displays the magnitude of an influence of each of the plurality of emotion indicators on the action indicator. Specifically, the influence display unit 122 displays screens (described later) illustrated in FIGS. 7, 8, 9, 10, 11, and 12. The improvement notification unit 124 notifies an analyst of an effective emotion point for improving the action indicator.

The communication unit 114 includes a transmission unit 132 that transmits data and a reception unit 134 that receives data.

The data processing unit 112 includes an action indicator calculation unit 126, an emotion indicator calculation unit 128, and a correlation calculation unit 130. The action indicator calculation unit 126 calculates the action indicator based on the above-described first type question. Specifically, the action indicator calculation unit 126 collects reply data of the first type question in a user group to be surveyed, calculates a recommendation value, a continuation value, and a purchase value by the above-described method, and calculates an average value of these three values as the action indicator. The action indicator calculation unit 126 calculates the action indicator for each user. By calculating an average value of the action indicators of a user group to be surveyed, the action indicator calculation unit 126 may calculate the action indicator (average action indicator) as the entire group.

The emotion indicator calculation unit 128 calculates the emotion indicator based on the above-described second type question. Specifically, the emotion indicator calculation unit 128 calculates the emotion indicator for each of the 13 emotion points for each user on an individual basis. The emotion indicator calculation unit 128 calculates the emotion indicator for each user. By calculating an average value of the emotion indicators of a user group to be surveyed, the emotion indicator calculation unit 128 may calculate the emotion indicator as the entire group for each of the emotion points.

The correlation calculation unit 130 calculates correlation coefficients between the emotion indicators and the action indicators obtained from a plurality of user. Specifically, first, the correlation calculation unit 130 collects, for "(P1) sympathy", the emotion indicators (hereinafter, referred to as "emotion indicator (P1)") of the plurality of users. Next, using the set of the emotion indicators (P1) of the plurality of users and the set of the action indicators of the plurality of users as a target, the correlation calculation unit 130 calculates a correlation coefficient (hereinafter, referred to as "psychological correlation coefficient) based on the formula of a Pearson product-moment correlation coefficient. The correlation calculation unit 130 similarly calculates 13 types of psychological correlation coefficients for the 13 types of emotion indicators, respectively.

Figure 6:
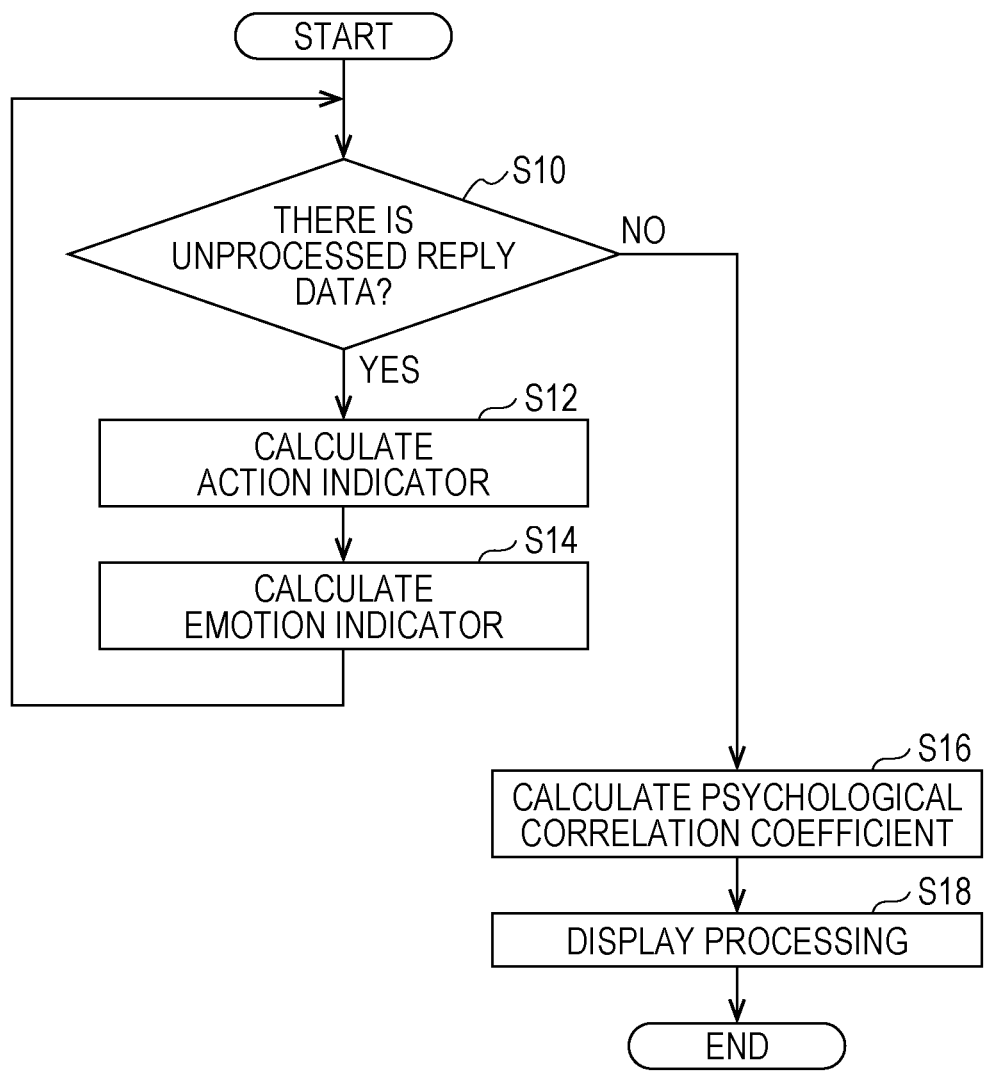
FIG. 6 is a flowchart illustrating a psychological correlation coefficient calculating process.

FIG. 6 is a flowchart illustrating a psychological correlation coefficient calculating process.

First, the reception unit 134 collects reply data based on the first type question and the second type question from a user who receives a financial service. First, if there is unprocessed reply data (Y in S10), the action indicator calculation unit 126 calculates the action indicator based on a reply to the first type question included in the new reply data (S12). Next, the emotion indicator calculation unit 128 calculates 13 types of emotion indicators based on a replay to the second type question included in the reply data of the same user (S14). For one user, one type of action indicator and 13 types of emotion indicators are calculated. Similar processing is repeated for all the pieces of reply data.

After calculating the action indicators and the emotion indicators from all the pieces of reply data (N in S10), the correlation calculation unit 130 calculates a psychological correlation coefficient for each of the emotion indicators (S16). The influence display unit 122 graphically displays an influence of the emotion indicator in a predetermined format based on the calculation result (S18). At this time, the improvement notification unit 124 also displays an improvement point. The improvement notification unit 124 notifies an analyst, as the improvement point, an emotion point in which the psychological correlation coefficient is equal to or more than a first threshold, for example, 0.5 or more, and the emotion indicator is equal to or less than a second threshold, for example, 0 or less.

Figure 7:
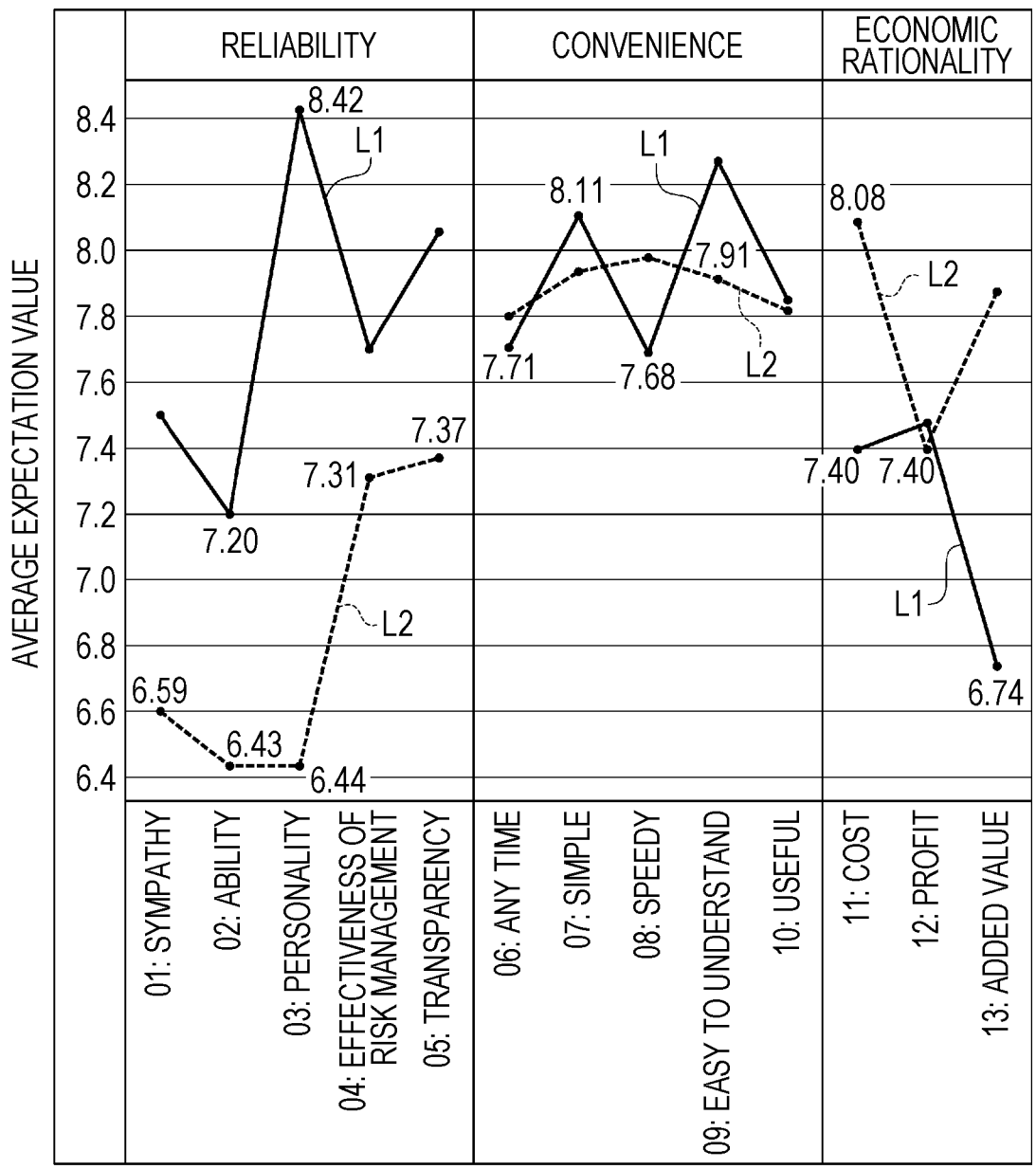
FIG. 7 is a screen diagram of an expectation value screen.

FIG. 7 is a screen diagram of an expectation value screen 140.

The influence display unit 122 displays the expectation value screen 140 according to an instruction from an analyst. The vertical axis indicates an average value of expectation values (hereinafter, referred to as "average expectation value"). A graph L1 illustrates a store type bank, and a graph L2 illustrates an Internet bank. For example, in a user group of the Internet bank, an average expectation value for "(P3) personality" is "6.44". On the other hand, in a user group of the store type bank, an average expectation value for "(P3) personality" is "8.42". Therefore, it can be seen that a user of the store type bank has a higher expectation for the personality of a servicer than when using the Internet bank.

In addition, in the user group of the Internet bank, an average expectation value for "(P11) cost" is "8.08". It can be seen that a user has an expectation for low cost when using the Internet bank. On the other hand, in the user group of the store type bank, an average expectation value for "(P11) cost" is "7.40". It can be seen that a user of the store type bank has a lower expectation for cost than a user of the Internet bank.

In the user group of the store type bank, an average expectation value for "(P2) ability" is "7.20". On the other hand, in the user group of the Internet bank, an average expectation value for "(P2) ability" is "6.43", and it can be seen that the expectation is relatively low.

Figure 8:
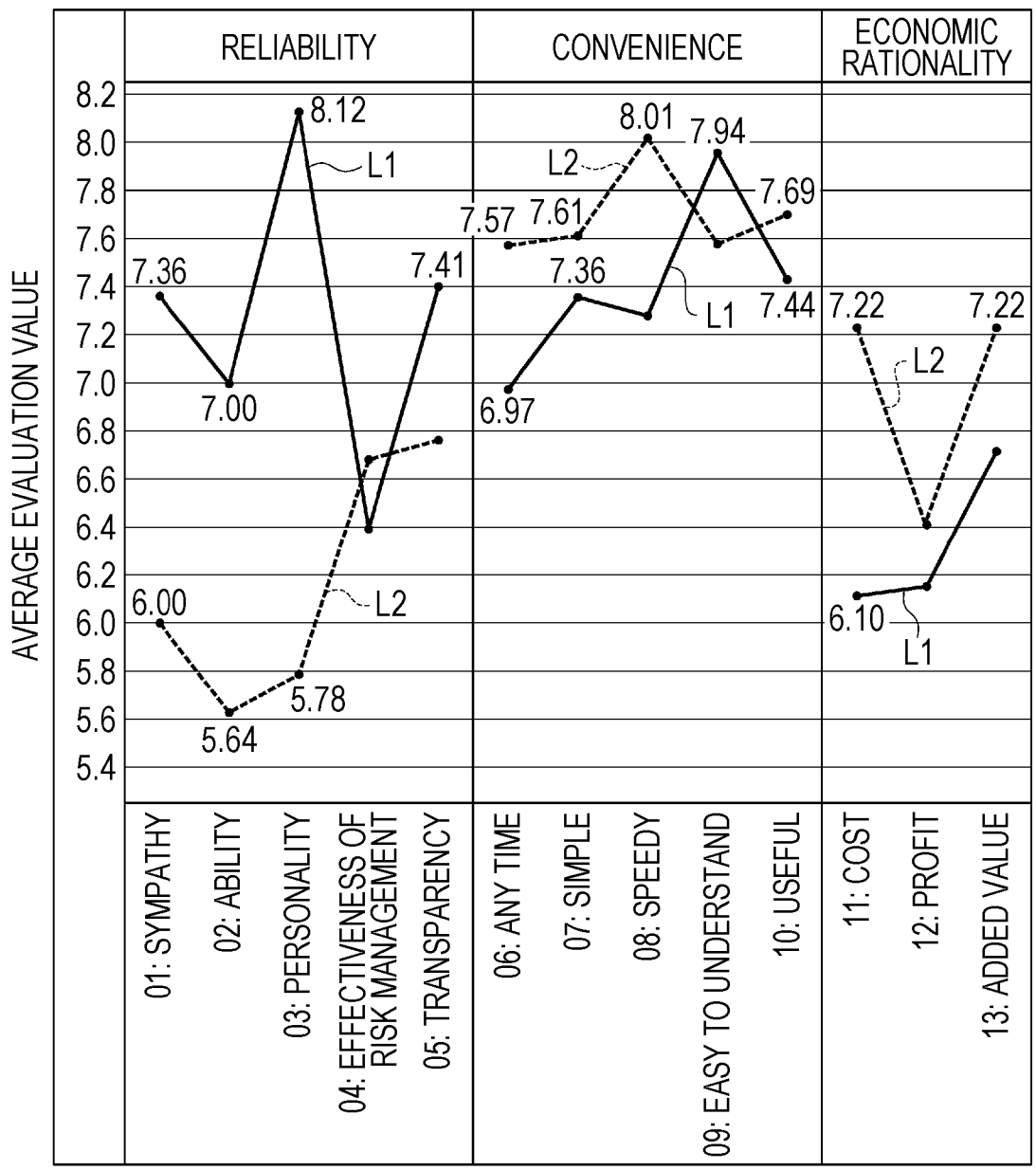
FIG. 8 is a screen diagram of an evaluation value screen.

FIG. 8 is a screen diagram of an evaluation value screen 142.

The influence display unit 122 displays the evaluation value screen 142 according to an instruction from an analyst. The vertical axis indicates an average value of evaluation values (hereinafter, referred to as "average evaluation value"). In the user group of the Internet bank (graph L2), an average value of evaluation values of "(P2) ability" is "5.64", and an average evaluation value of "(P3) personality" is "5.78". On the other hand, in the user group of the store type bank (graph L1), an average evaluation value of "(P2) ability" is "7.00", and an average evaluation value of "(P3) personality" is "8.12".

Figure 9:
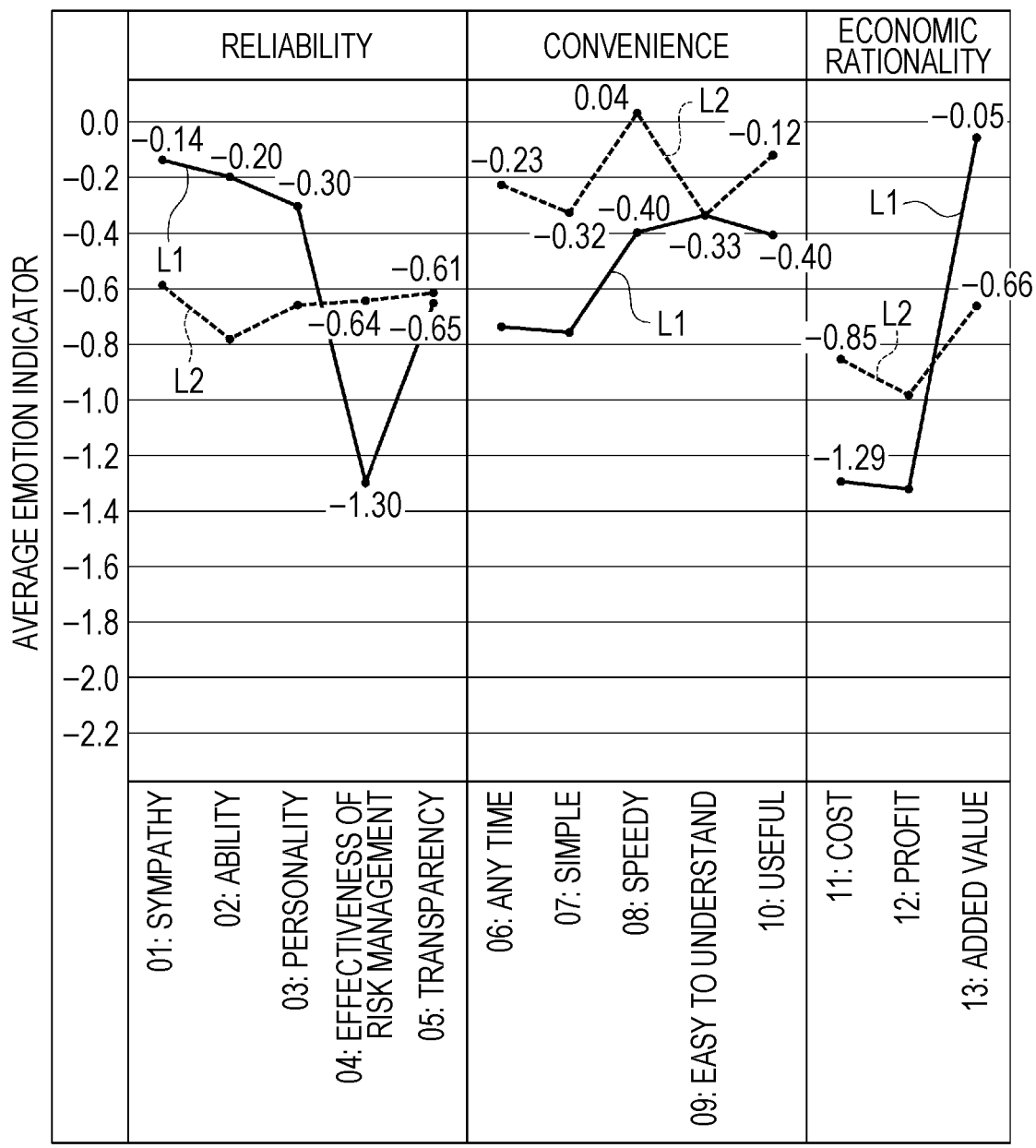
FIG. 9 is a screen diagram of an emotion indicator screen.

FIG. 9 is a screen diagram of an emotion indicator screen 144.

The influence display unit 122 displays the emotion indicator screen 144 according to an instruction from an analyst. The vertical axis indicates an average value of emotion indicators (evaluation value−expectation value) of a plurality of users (hereinafter, referred to as "average emotion indicator"). As described above, a high emotion indicator indicates "satisfaction higher than expectation", and a low emotion indicator indicates "dissatisfaction lower than expectation".

In the user group of the store type bank (graph L1), an average emotion indicator (P4: effectiveness of risk management) is "−1.30". This means that a user is strongly dissatisfied with "(P4) effectiveness of risk management" in the store type bank. On the other hand, in the user group of the store type bank, an average emotion indicator (P3: personality) is "−0.30". This means that "(P3) personality" in the store type bank generally meets a user's expectation.

In the user group of the Internet bank (graph L2), an average emotion indicator (P8: speedy) is "0.04". This means that the Internet bank can almost meet a user's expectation for "(P8) speedy".

Figure 10:
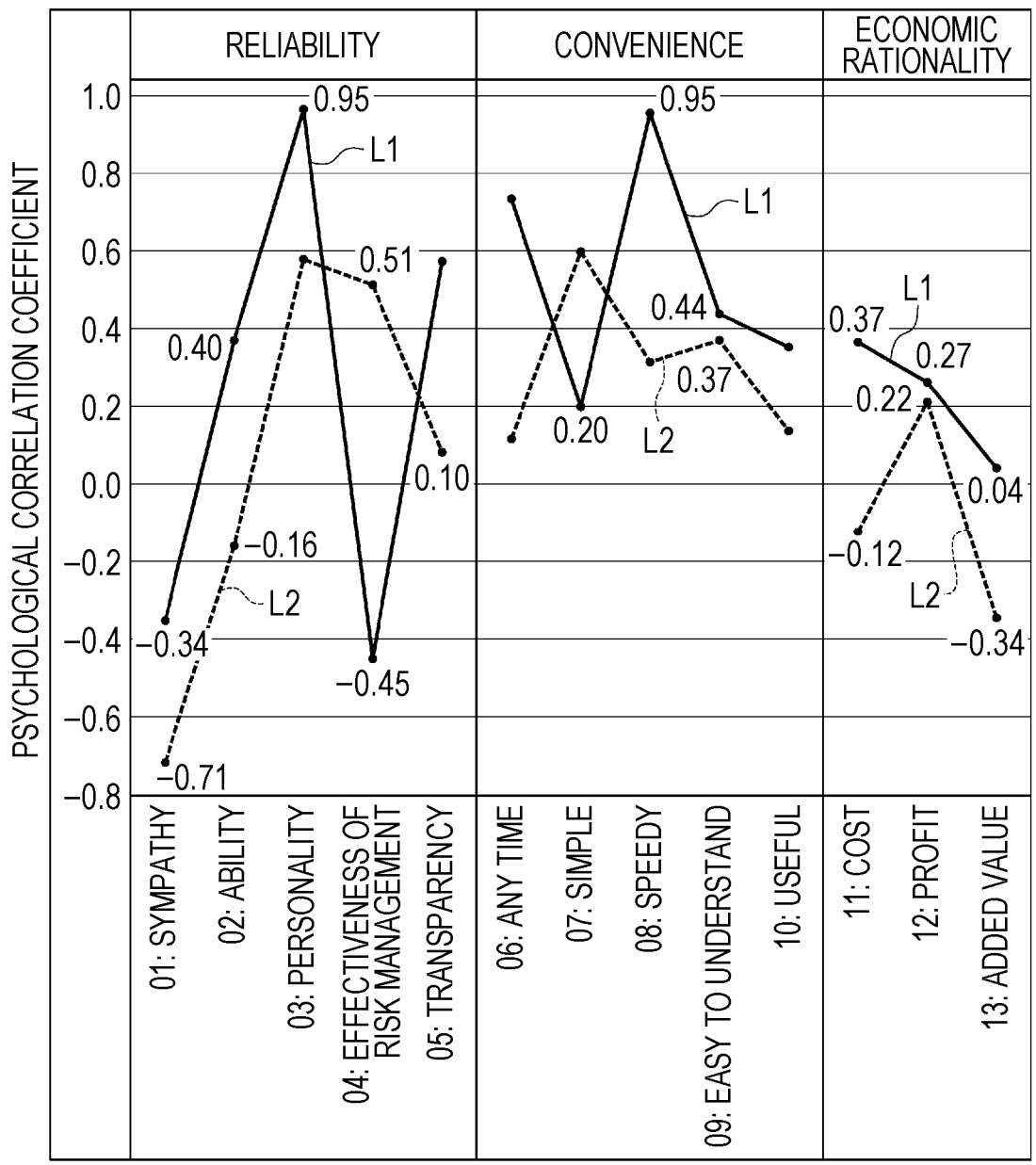
FIG. 10 is a screen diagram of a psychological correlation screen.

FIG. 10 is a screen diagram of a psychological correlation screen 146.

The influence display unit 122 displays the psychological correlation screen 146 according to an instruction from an analyst. The vertical axis indicates a psychological correlation coefficient of an emotion indicator and an action indicator (CX). In a case of the store type bank (graph L1), a psychological correlation coefficient of "(P3) personality", which is one of the emotion points, is "0.95". Therefore, giving a good impression to a customer about the personality of a servicer is likely to lead to improvement in the action indicator. According to the emotion indicator screen 144 of FIG. 9, since an average emotion indicator (P3: personality) is "−0.30", which is never low, but it can be seen that there is room for further improving "(P3) personality".

In the store type bank, a psychological correlation coefficient of "(P4) effectiveness of risk management" is "−0.45". Therefore, it is considered that improvement in risk management is unlikely to lead to improvement in the action indicator. According to the emotion indicator screen 144 of FIG. 9, an average emotion indicator (P4: effectiveness of risk management) is "−1.30", which is very low. "(P4) effectiveness of risk management" has a lot of room for improvement, but is not unlikely to lead to improvement in customer experience.

The improvement notification unit 124 refers to the emotion indicator and the psychological correlation coefficient and notifies an analyst of an improvement point. As described above, in the present embodiment, the improvement notification unit 124 notifies an analyst of an emotion point in which the psychological correlation coefficient is 0.5 or more and the emotion indicator is 0 or less as an improvement point. Therefore, according to the emotion indicator screen 144 of FIG. 9 and the psychological correlation screen 146 of FIG. 10, the improvement notification unit 124 proposes "(P3) personality", "(P5) transparency", "(P6) any time, and "(P8) speedy" as improvement points for the store type bank (graph L1). In addition, the improvement notification unit 124 proposes "(P3) personality", "(P4) effectiveness of risk management", and "(P7) simple" as improvement points for the Internet bank (graph L2).

Figure 11:
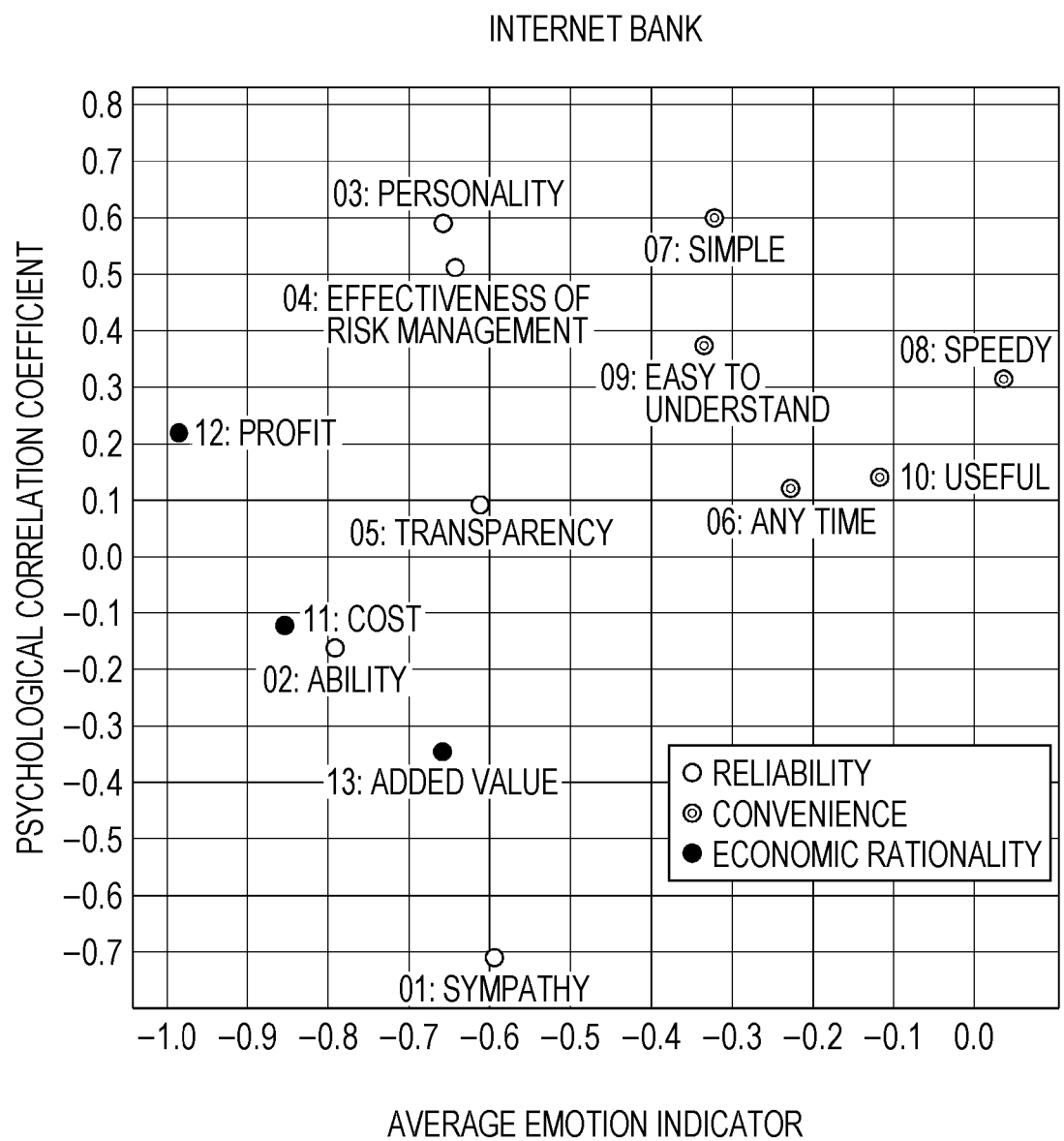
FIG. 11 is a screen diagram of a customer psychological analysis screen related to an Internet bank.

FIG. 11 is a screen diagram of a customer psychological analysis screen 148 related to the Internet bank.

The influence display unit 122 displays the customer psychological analysis screen 148 as an analysis result for the user group of the Internet bank according to an instruction from an analyst. The horizontal axis indicates an average emotion indicator, and the vertical axis indicates a psychological correlation coefficient. As it goes to a right side, a higher (average) emotion indicator, that is, a higher degree of satisfaction with respect to expectation is indicated. As it goes to an upper side, a higher psychological correlation coefficient, that is, a stronger positive correlation between an emotion indicator and an action indicator is indicated.

According to the customer psychological analysis screen 148, an emotion indicator for convenience is generally large, and a psychological correlation coefficient is also large. For this reason, for the Internet bank, it is considered that profitability can be achieved by concentrating management resources in order to further improve convenience.

Figure 12:
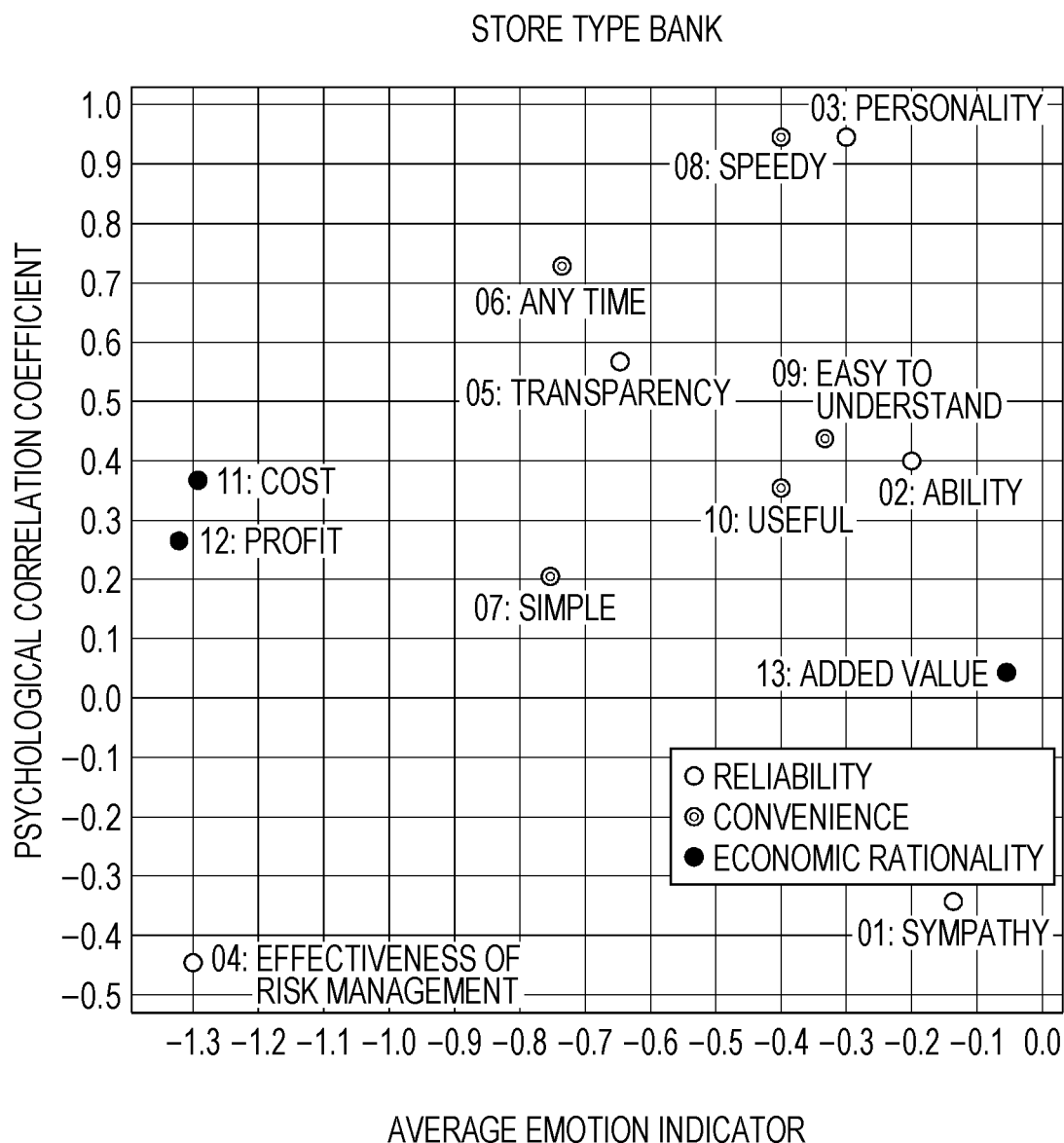
FIG. 12 is a screen diagram of a customer psychological analysis screen related to a store type bank.

FIG. 12 is a screen diagram of a customer psychological analysis screen 150 related to the store type bank.

The influence display unit 122 displays the customer psychological analysis screen 150 as an analysis result for the user group of the store type bank according to an instruction from an analyst. The horizontal axis indicates an average emotion indicator, and the vertical axis indicates a psychological correlation coefficient.

According to the customer psychological analysis screen 150, some of the emotion indicators related to convenience are considered to largely contribute to improvement in the action indicator and furthermore, to profitability, but an effect similar to the effect for the Internet bank cannot be expected. On the other hand, for "(P3) personality", it is already possible to provide a high level of satisfaction, but there is room for further improvement. In addition, it can be seen that an emotion indicator of "(P01) sympathy" is high, but the high emotion indicator is unlikely to lead to improvement in the action indicator.

Hitherto, the customer analysis device 100 has been described based on the embodiment.

According to the present embodiment, by defining an action indicator by a plurality of elements that cancels out noise thoughts thereof, it is possible to enhance a positive correlation between profitability and the action indicator. In particular, it has been found that for "service that is hardly recommended to a person" such as a financial service, the CX, which is a new action indicator, has a higher correlation than the NPS.

In the present embodiment, a plurality of emotion indicators is set as emotional factors affecting the action indicator. By calculating a psychological correlation coefficient as the magnitude of an influence of each of the emotion indicators on the action indicator, it is possible to search for an effective emotion point to improve the action indicator. According to such a control method, by intensively inputting limited management resources to improve an appropriate emotion point, it is easy to efficiently and rationally reform organization business.

Note that the present invention is not limited to the above embodiment and a modification, and can be embodied by modifying the components without departing from the gist. Various inventions may be formed by appropriately combining a plurality of components disclosed in the above-described embodiment or the modification. In addition, some components may be deleted from all the components described in the above-described embodiment and the modification.

[Modification]

In the present embodiment, it has been described that an average value of the recommendation value, the continuation value, and the purchase value is calculated as the action indicator. As a modification, the action indicator may be calculated by weight-averaging these three values. For example, weighting factors of the three values may be adjusted such that a positive correlation coefficient with a business indicator indicating profitability is increased.

[Evaluation of Person in Charge]

As a result of further studies, the present inventor has considered that an action indicator (CX) indicating an action intention for a service is not only useful for a company that provides the service, but also can be used for business evaluation of a site person in charge who actually comes into contact with a customer to introduce, provide, and mediate the service, for example, an employee who comes into contact with a customer, such as a person in charge of customer or a branch manager.

The strength of a recommendation intention, a continuation intention, and a purchase intention largely depends not only on attractiveness of a service but also on ability of a person in charge. As described above, these action indicators include noise thoughts, but the recommendation intention, the continuation intention, and the purchase intention can complement each other's noise thoughts. For example, by aggregating a recommendation value, a continuation value, and a purchase value for a person in charge A from customers, and calculating a total value thereof or an average value thereof, it is considered that business evaluation of the person in charge A can be performed.

Nevertheless, there may be a customer who gives 0 point (lowest point) to the recommendation value because "no matter who a person in charge is, I do not intend to recommend the person in charge to others, and I cannot be responsible for it". Although the noise thought for the recommendation intention can be complemented by the continuation value, it is pitiable for the person in charge to have the lowest evaluation for such a reason, and there may be a case not appropriate as the business evaluation. In particular, when the number of customers related to one person in charge is small, the business evaluation is easily affected by the noise thought. Therefore, the present inventor has considered that improvement is necessary when the action indicator is used for business evaluation of a person in charge.

Figure 13:
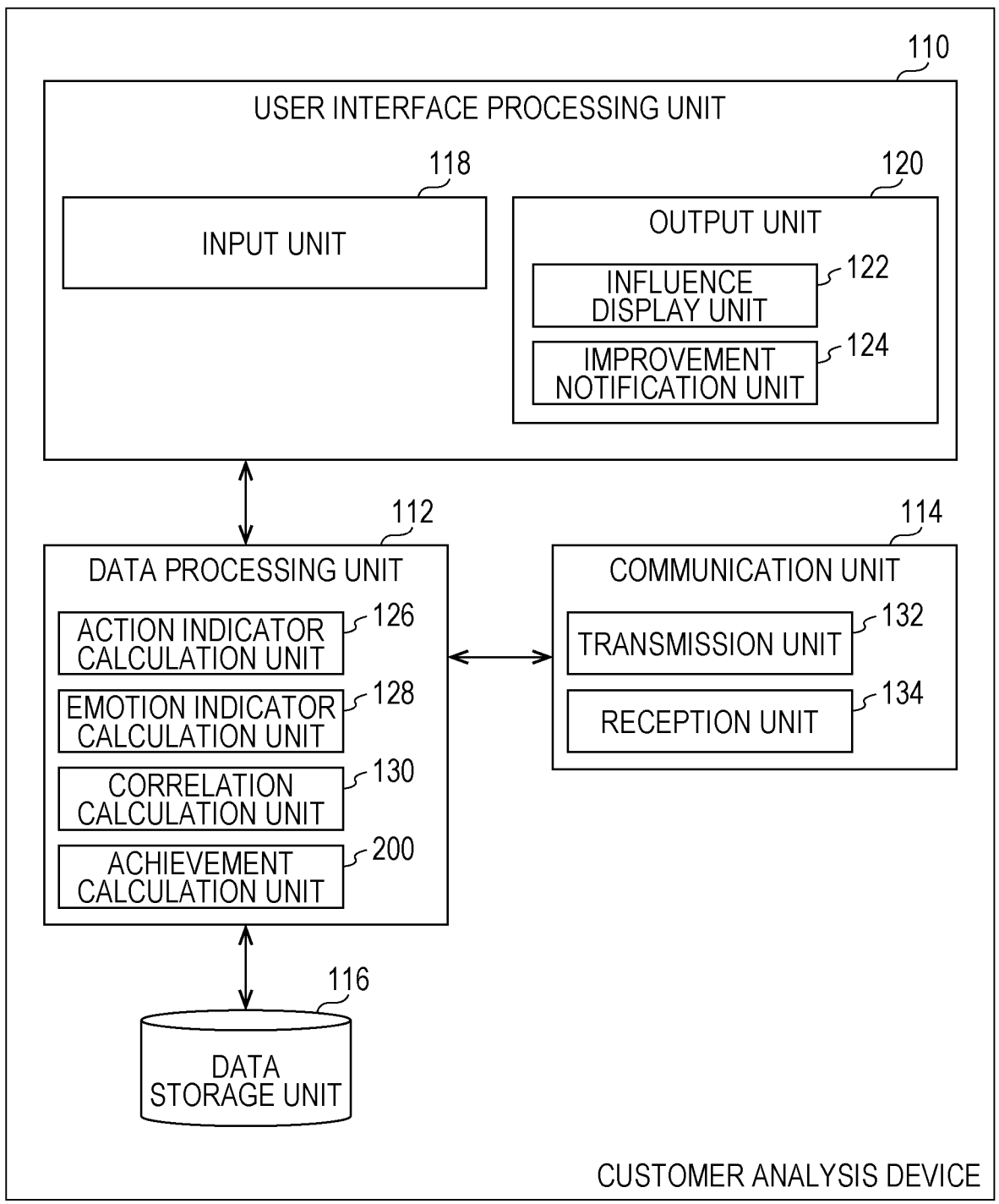
FIG. 13 is a functional block diagram of a customer analysis device in a modification.

FIG. 13 is a functional block diagram of the customer analysis device 100 in a modification.

In the customer analysis device 100 according to the modification, the data processing unit 112 further includes an achievement calculation unit 200. The achievement calculation unit 200 performs business evaluation of a person in charge. The customer analysis device 100 acquires reply data regarding an action indicator from a customer using the input unit 118 or the reception unit 134 as a "reply acquisition unit".

FIG. 14 illustrates an excerpt of a questionnaire regarding a recommendation intention.

A customer inputs a reply to the first type question "How likely are you to recommend the current person in charge to a close friend or relative?" regarding the person in charge on a scale of 10 points. The input value at this time is a recommendation value. The questionnaire may be provided by paper, or the transmission unit 132 of the customer analysis device 100 may provide the questionnaire as a web page to a tablet computer or the like. The questionnaire includes the three types of first type questions (recommendation, continuation, and purchase) regarding a person in charge in addition to various questions regarding the emotion indicator described above.

Hereinafter, a reply to the recommendation value or the like among the first type questions is referred to as a "main reply". The recommendation value or the like is calculated based on the main reply.

In addition to the first type question, a question that is to be a precondition of the first type question "If you select the above number because you do not intend to recommend any person in charge at a bank or a securities company other than the current person in charge to others, please write a check mark here." is defined. Hereinafter, a reply to this prerequisite question is referred to as a "sub-reply".

FIG. 15 illustrates an excerpt of a questionnaire regarding a continuation intention.

A customer inputs a reply to the first type question "How likely are you to continue to use•••through the current person in charge in the future?" regarding the person in charge on a scale of 10 points. Also for the continuation intention, similarly to the recommendation intention, the prerequisite question "If you select the above number because you do not intend to use any person in charge at a bank or a securities company other than the current person in charge, please write a check mark here." is defined.

FIG. 16 illustrates an excerpt of a questionnaire regarding a purchase intention.

A customer inputs a reply to the first type question "How likely are you to purchase a financial product at•••through the current person in charge in the future?" regarding the person in charge on a scale of 10 points. Also for the purchase intention, similarly to the recommendation intention, the prerequisite question "If you select the above number because you do not intend to purchase a financial product at a bank or a securities company through any person in charge other than the current person in charge, please write a check mark here." is defined.

The achievement calculation unit 200 calculates business evaluation of the person in charge by aggregating the main replies and the sub-replies related to the first type question described above. At this time, a main reply in which a sub-reply is checked is excluded from the calculation target of the business evaluation.

Figure 17:
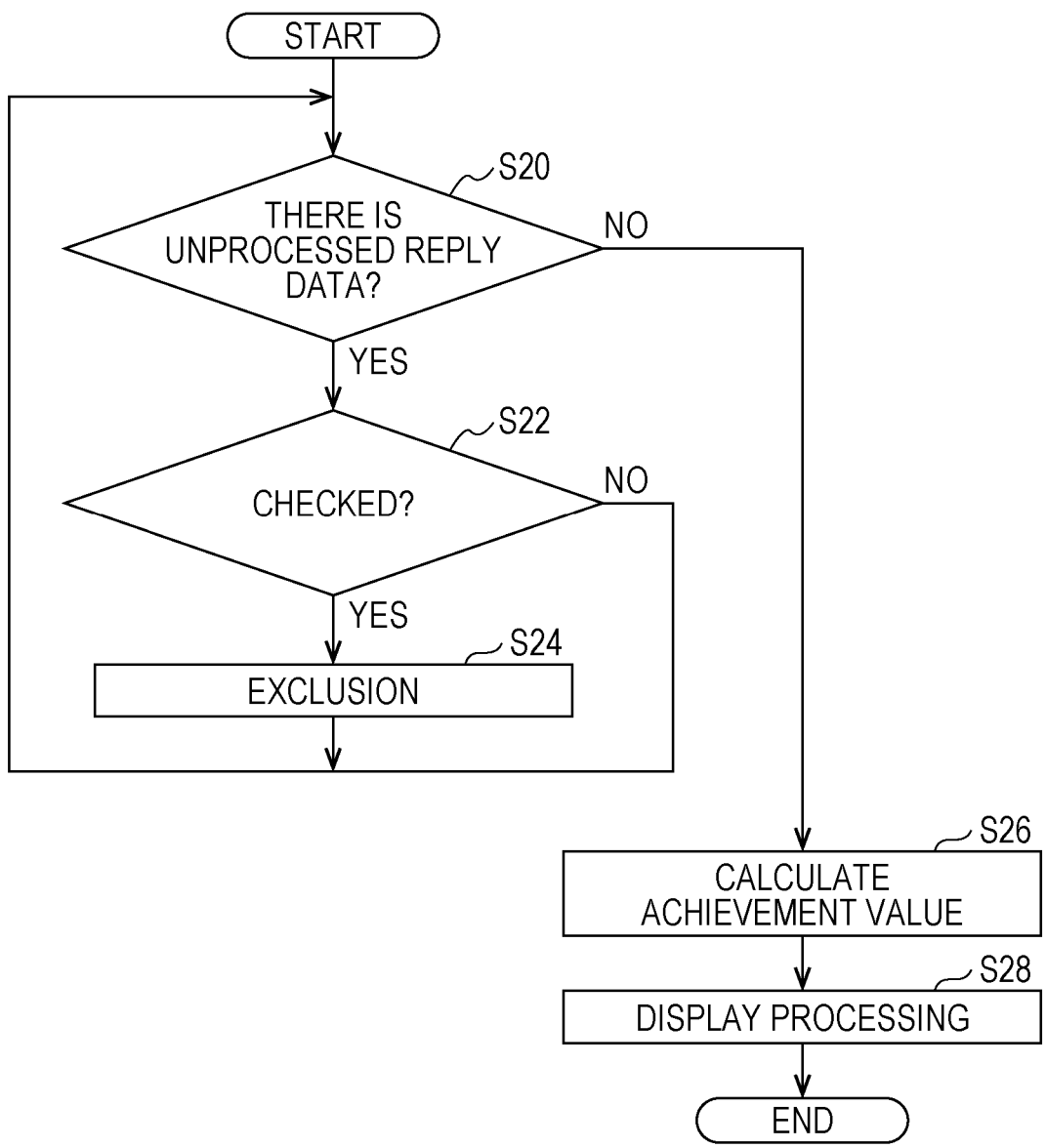
FIG. 17 is a flowchart illustrating an achievement value calculating process.

FIG. 17 is a flowchart illustrating an achievement value calculating process.

First, the reception unit 134 collects reply data based on the first type question, the prerequisite question, and the second type question from a user who receives a financial service. If there is unprocessed reply data (Y in S20), the achievement calculation unit 200 determines whether a sub-reply is checked for any one of the recommendation value, the continuation value, and the purchase value (S22). If a sub-reply is checked (Y in S22), a main reply for the sub-reply is excluded from the calculation target for the business evaluation (S24). If a sub-reply is not checked (N in S22), a main reply for the sub-reply is included in the calculation target.

An average value of the recommendation value, the continuation value, and the purchase value included in the main reply as the calculation target is calculated as an achievement value for each person in charge (S26). The output unit 120 displays an achievement value for each person in charge (S28).

According to the above control method, it is possible to exclude a recommendation value or the like that has low evaluation for a reason other than an effort of a person himself/herself in charge, and therefore it is possible to more appropriately evaluate achievement of the person himself/herself in charge. If the achievement value is calculated not on a person in charge basis but on a branch basis, the above control method can also be applied to business evaluation as a branch manager.

As illustrated in FIG. 14 and the like, a question "please tell us a reason why you select the above number" may be included as a part of the prerequisite question, and a free comment may be input or described by a customer. In this free comment box, reasons that cannot be attributed to a fault of a person in charge, such as "I am elderly and do not intend to purchase a new product anymore" and "the current person in charge is a new person in charge and therefore I cannot understand the person in charge yet", may be described. A questionnaire in which such a comment is described may be excluded from the target of the business evaluation. Analysis of a comment may be determined by a human, or the achievement calculation unit 200 may detect a questionnaire having a comment including any exclusion condition (for example, "because of old age") by natural language processing and exclude the questionnaire.

What is claimed is:
1. A customer analysis device comprising:
an action indicator calculation unit that acquires replies from a user who receives a predetermined service to one or more first type questions defined for surveying an action desire for the service and calculates an action indicator based on the one or more replies;
an emotion indicator calculation unit that acquires replies from the user who receives the service to a plurality of second type questions defined for surveying a customer emotion for the service and calculates a plurality of types of emotion indicators based on the plurality of replies;
a correlation calculation unit that calculates a correlation coefficient between the action indicator and each of the plurality of types of emotion indicators;
an influence display unit that graphically displays an influence of each of the plurality of emotion indicators on the action indicator based on the calculated correlation coefficient;
a transmission unit that provides questionnaires to the user, the questionnaires include a first main question for surveying a desire to purchase a new service from a current person in charge who provides or intermediates the predetermined service, a first sub-question for asking the user whether or not a first main reply to the first main question is made due to a reason that is not attributed to a fault of the person in charge, a second main question for surveying a desire to continue to use the service by the person in charge, a second sub-question for asking the user whether or not a second main reply to the second main question is made due to a reason that is not attributed to a fault of the person in charge, a third main question for surveying a desire to recommend the person in charge to another user, and a third sub-question for asking the user whether or not a third main reply to the third main question is made due to a reason that is not attributed to a fault of the person in charge;
a reply acquisition unit that acquires the first main reply, the second main reply, the third main reply, a first sub-reply to the first sub-question, a second sub-reply to the second sub-question and a third sub-reply to the third sub-question; and
an achievement calculation unit that calculates an achievement value of the person in charge based on the first main reply, the second main reply and the third main reply, wherein
the achievement calculation unit excludes, from a target for calculating the achievement value of the person in charge, the first main reply in which the first sub-reply indicates that the first main reply is made due to the reason that is not attributed to the fault of the person in charge, the second main reply in which the second sub-reply indicates that the second main reply is made due to the reason that is not attributed to the fault of the person in charge, and/or the third main reply in which the third sub-reply indicates that the third main reply is made due to the reason that is not attributed to the fault of the person in charge, the questionnaires further include a free comment box allowing the user to input a comment, and the achievement calculation unit detects at least one of the questionnaires having a comment including any excluding condition by natural language processing and excludes the least one of the questionnaires having the comment including any excluding condition from the target for calculating the achievement value of the person in charge.

2. The customer analysis device according to claim 1, wherein the action indicator calculation unit calculates the action indicator based on a reply from a user to each of a first type question for surveying a desire to purchase the service, a first type question for surveying a desire to continue the service, and a first type question for surveying a desire to recommend the service.

3. The customer analysis device according to claim 1, wherein the emotion indicator calculation unit acquires two types of replies of a degree of expectation before receiving the service and a degree of satisfaction after receiving the service, and acquires a difference value between the degree of satisfaction and the degree of expectation as a reply to the second type question.

4. The customer analysis device according to claim 1, further comprising an improvement notification unit that notifies a user of a second type question in which the correlation coefficient with respect to the action indicator is equal to or more than a first threshold and the difference value as the reply is equal to or less than a second threshold.

5. A non-transitory computer-readable medium storing a customer analysis program that causes a computer to execute:

a function of acquiring replies from a user who receives a predetermined service to one or more first type questions defined for surveying an action desire for the service and calculating an action indicator based on the one or more replies;

a function of acquiring replies from the user who receives the service to a plurality of second type questions defined for surveying a customer emotion for the service and calculating a plurality of types of emotion indicators based on the plurality of replies;

a function of calculating a correlation coefficient between the action indicator and each of the plurality of types of emotion indicators;

a function of graphically displaying an influence of each of the plurality of emotion indicators on the action indicator based on the calculated correlation coefficient;

a function of providing questionnaires to the user, the questionnaires include a first main question for surveying a desire to purchase a new service from a current person in charge who provides or intermediates the predetermined service, a first sub-question for asking the user whether or not a first main reply to the first main question is made due to a reason that is not attributed to a fault of the person in charge, a second main question for surveying a desire to continue to use the service by the person in charge, a second sub-question for asking the user whether or not a second main reply to the second main question is made due to a reason that is not attributed to a fault of the person in charge, a third main question for surveying a desire to recommend the person in charge to another user, and a third sub-question for asking the user whether or not a third main reply to the third main question is made due to a reason that is not attributed to a fault of the person in charge;

a function of acquiring the first main reply, the second main reply, the third main reply, a first sub-reply to the first sub-question, a second sub-reply to the second sub-question and a third sub-reply to the third sub-question; and a function of calculating an achievement value of the person in charge based on the first main reply, the second main reply and the third main reply, wherein the function of calculating the achievement value excludes, from a target for calculating the achievement value of the person in charge, the first main reply in which the first sub-reply indicates that the first main reply is made due to the reason that is not attributed to the fault of the person in charge, the second main reply in which the second sub-reply indicates that the second main reply is made due to the reason that is not attributed to the fault of the person in charge, and/or the third main reply in which the third sub-reply indicates that the third main reply is made due to the reason that is not attributed to the fault of the person in charge, the questionnaires further include a free comment box allowing the user to input a comment, and the function of calculating the achievement value detects least one of the questionnaires having a comment including any excluding condition by natural language processing and excludes the least one of the questionnaires having the comment including any excluding condition from the target for calculating the achievement value of the person in charge.

* * * * *